Mar. 6, 1923.

W. E. JONES

HARROW

Filed Sept. 24, 1921

W. E. Jones
INVENTOR

BY Victor J. Evans
ATTORNEY

WITNESS:

Mar. 6, 1923.
W. E. JONES
1,447,862
HARROW
Filed Sept. 24, 1921
3 sheets-sheet 2
Fig. 3.
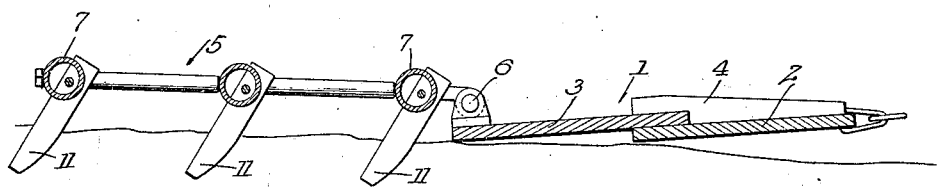
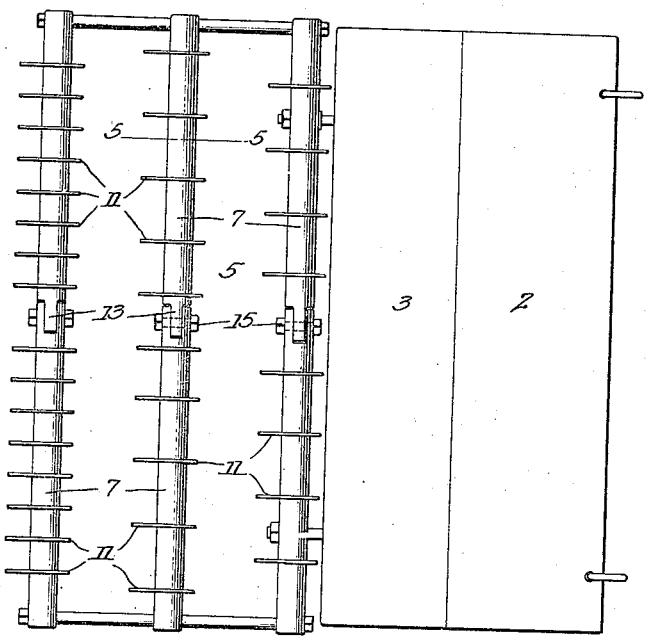
Fig. 4.
W. E. Jones
INVENTOR
WITNESS:
BY Victor J. Evans
ATTORNEY Mar. 6, 1923.

W. E. JONES
HARROW
Filed Sept. 24, 1921

W. E. Jones,
INVENTOR

BY Victor J. Evans
ATTORNEY

Patented Mar. 6, 1923.

1,447,862

UNITED STATES PATENT OFFICE.

WILLIAM EARLES JONES, OF KELLY, LOUISIANA, ASSIGNOR OF ONE-HALF TO JOHN V. ADAMS, OF McNARY, LOUISIANA.

HARROW.

Application filed September 24, 1921. Serial No. 502,876.

*To all whom it may concern:*

Be it known that I, WILLIAM E. JONES, a citizen of the United States, residing at Kelly, in the parish of Caldwell and State of Louisiana, have invented new and useful Improvements in Harrows, of which the following is a specification.

My present invention has reference to an agricultural machine and is in the nature of a sod or clod cutter.

The primary object of the invention is to produce a device of this character in which the ground to be harrowed is dragged to break the lumps or clogs as well as to beat down growth, and thereafter cut into by the knives of the harrow which is hingedly connected to the drag, the said knives being so arranged as to effectively cut and pulverize the soil and the depth at which they enter the soil is regulated by the operator on a platform at the rear of the harrow.

It is a further object to produce a soil treating implement in the nature of a combined drag and harrow in which the cutting knives of the harrow are of a particular and peculiar construction and mounted in such a manner that the same may be readily separated for sharpening or replacement when worn.

It is a still further object to produce an agricultural implement of this character that shall be of a simple and inexpensive construction, in which the cutting implements on the harrow may be in the nature of sweep blades or teeth connected in a manner to render the same interchangeable, and wherein the general combination is such as to treat the soil in an expeditious and in a better manner than like devices with which I am acquainted.

The foregoing, and other objects which will appear as the nature of the invention is better understood, may be accomplished by a construction, combination and operative arrangement of parts, such as is disclosed by the drawings which accompany and which form part of this specification.

In the drawings:—

Figure 3 is a sectional view on the line 3—3 of Figure 1.

Figure 4 is a bottom plan view.

Figure 1:
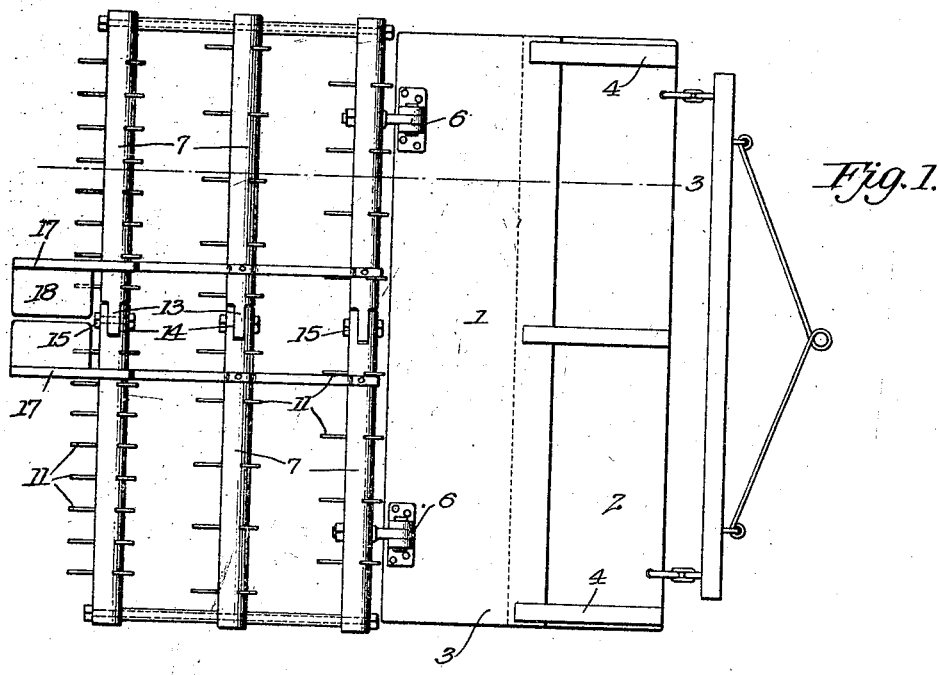
Figure 1 is a top plan view of the improvement.

As disclosed by the drawings, I make use of a drag and a harrow, both implements being hingedly connected, but the hinge connection is removable so that if desired, either implement can be independently used. The drag 1 comprises a front board 2 and a rear board 3. The rear board has its forward end arranged over the front board 2 and is bolted or otherwise secured thereto. The boards 2 and 3, at their sides are also connected together by cleats 4, and between the cleats the front board is preferably provided with openings for clevises that support the trees to which the draft animals are secured.

The harrow is indicated by the numeral 5, and the hinge connection between the drag and harrow by the numeral 6. The bars of the harrow, indicated by the numeral 7 are suitably connected together adjacent their ends. Each bar comprises any desired number of tubular sections, and each section from its ends is slitted at separate points longitudinally and the metal bounded by the slits is bent inwardly to provide ears 8, the said ears having aligning openings 9. The tube sections between the ears are slitted transversely, as at 10 for the reception of the cutting elements which are either in the nature of flat blades 11 or sweep blades 12.

The tube sections comprising each of the bars 7 are connected together in a manner which will permit the swinging of one section independent of the remaining sections. Thus at their meeting ends I provide one of the sections with a flattened portion in the nature of a tongue 13 and the other section with slits in the nature of grooves 14, which receive the tongues 13 therein, and I pass through the ends of the interengaging sections removable pivot members 15.

The knives are secured in the slits 10 by bolt members passing through the openings 9 in the ears 8 and similar openings 16 in the blades 11 or 12.

The frame of the harrow may be and preferably is provided at its ends with handle members 17, and between the said handles there is secured to the rear of the harrow blade a platform 18, and it is upon this platform that the operator stands when the knives are to fully enter the earth.

By reference to the drawings, it will be seen that I have provided the harrow with three knife carrying bars and that the knives of the intermediate bar are disposed centrally between the knives of the forward bar, and that the rear bar is provided with a greater number of knives than the remaining bars, at least two of the knives on the said rear bar being disposed between two of the knives on the central bar. With a construction as above described, the flexibly connected rod sections permit of the harrows properly entering the ground, suitable means, indicated by the numeral 19 being provided for limiting the swinging of the sectional rods in an upward direction, and of course, the weight of the operator on the platform regulates the extent at which the knives enter the ground. The arrangement of the knives, as above described, insures a pulverizing of the ground, and the cutting thereinto in a manner which will arrange the same in mounds so that air will enter between the mounds, and it is thought that the foregoing description, when taken in connection with the drawings will fully set forth the construction and advantages of the improvement to those skilled in the art to which such inventions relate. If desired, the knife beams may be constructed of angle steel sections.

It is, of course, to be understood that the tubular sections may be suitably reinforced by filler blocks or the like, at parts thereof liable to weakening and that knives having curved cutting edges may be employed if desired.

Figure 2:
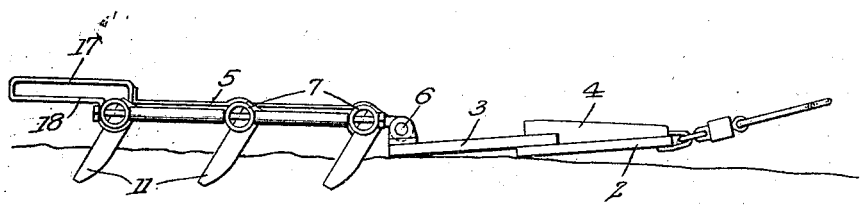
Figure 2 is a side elevation thereof.
Figure 5:
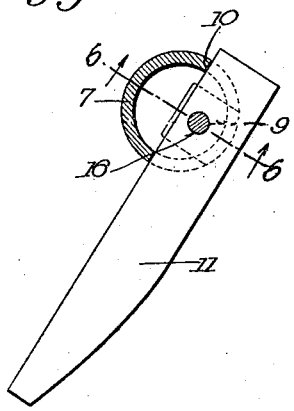
Figure 5 is a sectional view on the line 5—5 of Figure 4.
Figure 6:
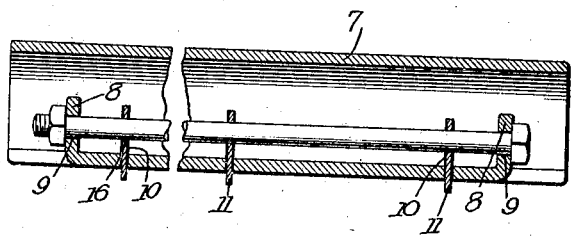
Figure 6 is a sectional view on the line 6—6 of Figure 5 looking in the direction of the arrows, the shaft on which the knives are mounted being in elevation.
Figure 7:
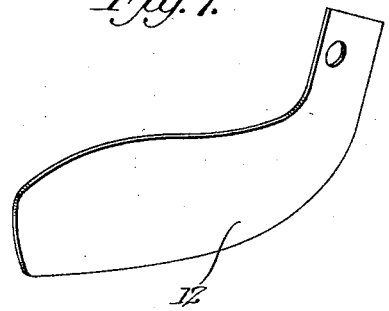
Figure 7 is a perspective view of a sweep knife which may be employed.

By employing curved knives as shown in Figure 2 of the drawings, the improvement may be employed for cutting pea vines and velvet bean vines for hay and also for fertilizing purposes where the same are too heavy or rank for a mower.

Having described the invention, I claim:—

1. In a soil treating implement, a drag, a harrow to the rear of the drag and hingedly connected therewith, said harrow including a frame, spaced longitudinal bars supported by the frame, each of said bars constructed of sections which are pivotally connected, each of said sections having its under face slotted transversely, knife blades received in the said slots, and means in the sections for securing the knife blades thereto.

2. In a ground treating implement, a drag, a harrow hingedly secured to the rear of the drag, said harrow including a frame provided with spaced longitudinal bars, each of said bars being constructed of tubular sections, each of said sections having inturned ears adjacent its ends and transverse slots between the ears, knife blades received in the slots, means passing through the ears and blades for securing the blades on the bar sections, means at the confronting ends of the sections holding the same in alignment, and means pivotally connecting the said ends of the sections whereby any of the sections may have an independent downward movement with respect to the other sections, and means limiting the upward movement of all of the sections.

In testimony whereof I affix my signature.

WILLIAM EARLES JONES.